United States Patent [19]

Booty, Sr. et al.

[11] Patent Number: 4,875,871
[45] Date of Patent: Oct. 24, 1989

[54] MODULAR ELECTRICAL CONDUCTOR SYSTEM

[75] Inventors: Donald J. Booty, Sr., Frankfort, Ill.; Donald J. Booty, Jr., Munster, Ind.

[73] Assignee: National Service Industries, Inc., Atlanta, Ga.

[21] Appl. No.: 670,322

[22] Filed: Nov. 9, 1904

[51] Int. Cl.[4] .......................... H01R 25/00
[52] U.S. Cl. .................. 439/209; 174/72 C; 200/51.04; 439/164; 439/210; 439/535
[58] Field of Search .................. 439/207–216, 439/110, 115–120, 164, 535; 174/48, 49, 70 C, 72 C; 200/51 R–51.07

[56] References Cited

U.S. PATENT DOCUMENTS

| | | | |
|---|---|---|---|
| 460,725 | 10/1891 | Markle | 439/209 |
| 1,137,489 | 4/1915 | Jellinek . | |
| 1,668,953 | 5/1928 | Erickson . | |
| 2,190,196 | 2/1940 | Semenyna . | |
| 2,218,545 | 10/1940 | Morten . | |
| 2,275,533 | 3/1942 | Landy | 439/118 |
| 2,320,332 | 5/1943 | Morten | 174/74 R |
| 2,611,800 | 9/1952 | Naughton . | |
| 2,647,242 | 7/1953 | Kutcka . | |
| 2,878,456 | 3/1959 | Cormier | 174/49 |
| 2,952,829 | 9/1960 | Grohsgal | 439/214 |
| 3,123,686 | 3/1964 | Leichsenring | 200/51 |
| 3,297,886 | 1/1967 | Danner | 200/51 R |
| 3,336,560 | 8/1967 | Myers | 439/211 |
| 3,546,360 | 12/1970 | Bailey | 174/48 |
| 3,580,984 | 5/1971 | Gladh | 174/48 |
| 3,659,247 | 4/1972 | Chaney et al. | 174/72 C |
| 3,683,101 | 8/1972 | Liberman | 174/49 |
| 3,715,627 | 2/1973 | D'Ausilio | 439/209 |
| 3,836,936 | 9/1974 | Clement | 439/115 |
| 3,973,818 | 8/1976 | Soquenne | 439/115 |
| 4,203,639 | 3/1980 | Vanden Houk et al. | 439/215 |
| 4,245,873 | 1/1981 | Markowitz | 439/32 |
| 4,272,689 | 1/1981 | Crosby et al. | 307/147 |
| 4,382,648 | 5/1983 | Propst et al. | 439/209 |
| 4,494,808 | 1/1985 | Widell et al. | 439/119 |

FOREIGN PATENT DOCUMENTS

| | | |
|---|---|---|
| 1130433 | 8/1982 | Canada . |
| 1146249 | 5/1983 | Canada . |
| 24022 | 2/1981 | European Pat. Off. ............. 174/49 |
| 2822883 | 11/1979 | Fed. Rep. of Germany . |
| 763991 | 2/1934 | France . |
| 591432 | 8/1947 | United Kingdom . |
| 2012497 | 7/1979 | United Kingdom . |

OTHER PUBLICATIONS

Wiremold Company Brochure, DIY Surface Wiring.
Wiremold Company Brochure, On-Wall Wiring.

Primary Examiner—Neil Abrams
Attorney, Agent, or Firm—Welsh & Katz, Ltd.

[57] ABSTRACT

A modular electrical conductor system for electrical wiring including one or more discrete elongated generally rectilinear track or carrier members and a plurality of modular electrical elements which are selectively connectable with the carrier members to establish a selected electrical circuit, the various carrier members and modular elements having preassembled electrical conductors carried therein such that ends of the conductors are adapted for mating electrical connection while being continually shielded from contact by an installer. The modular electrical elements include modular switch and/or receptacle elements having internal switch means operative to enable selective connection of internal conductors so as to vary circuit configurations to create at least one primary circuit and selective auxiliary circuits, each modular switch and receptacle element defining four quadrant oriented multiple conductor connector sites enabling the switch and receptacle elements to be connected to elongated carrier track members. The various prewire modular circuit components are preferably coded in a manner to enable easy selective connection in various circuit configuration by a person untrained in electrical circuitry.

31 Claims, 8 Drawing Sheets

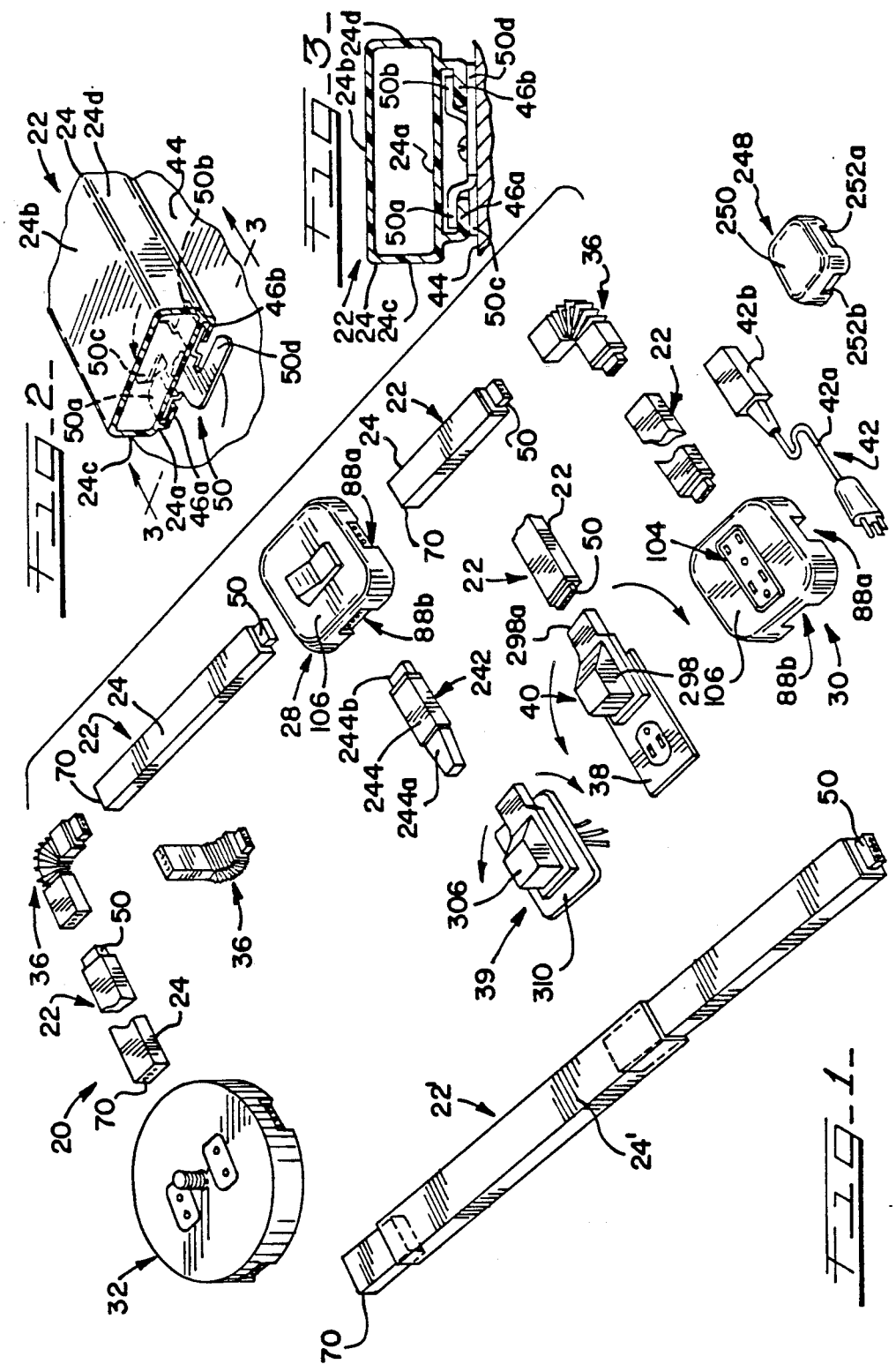

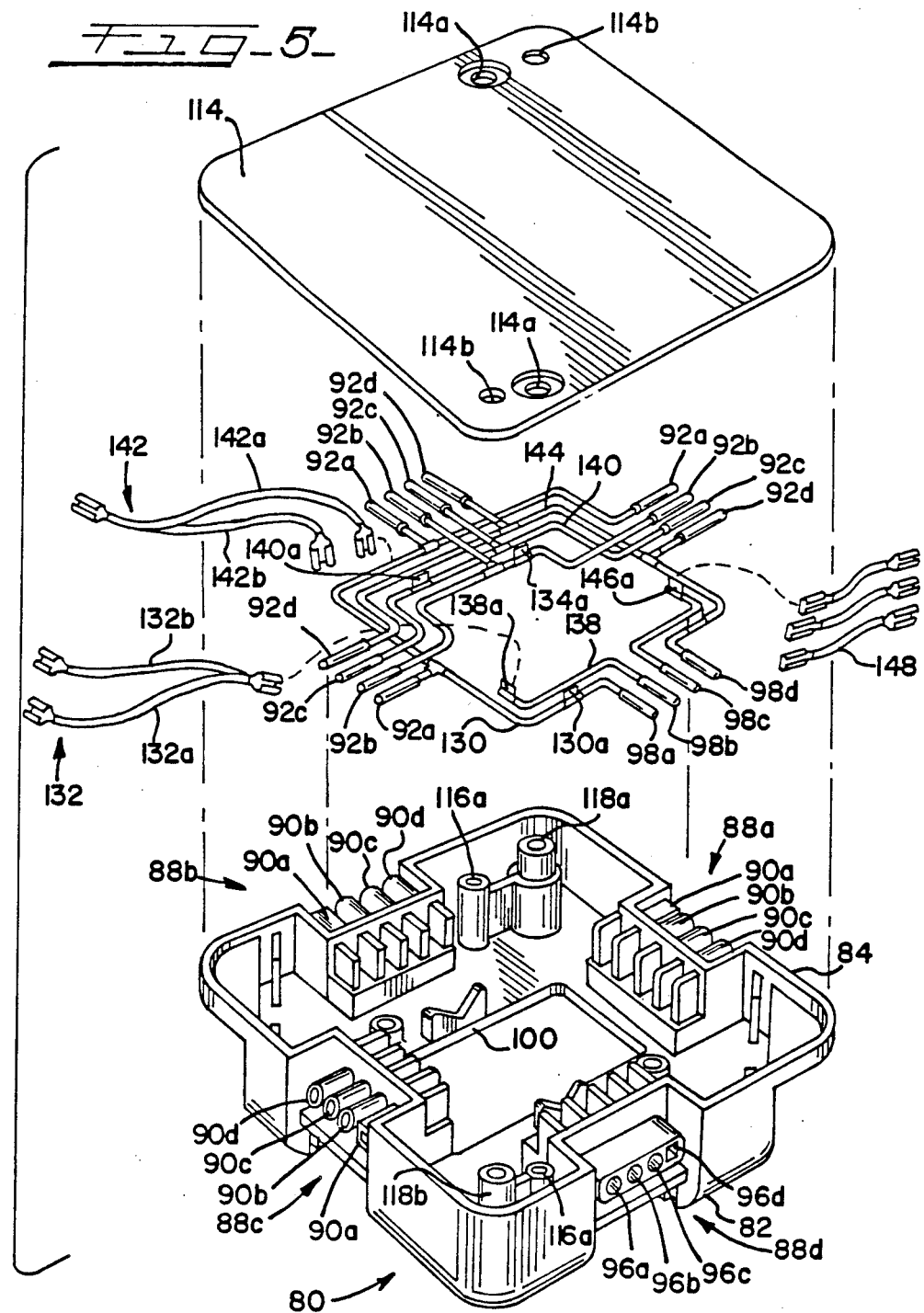

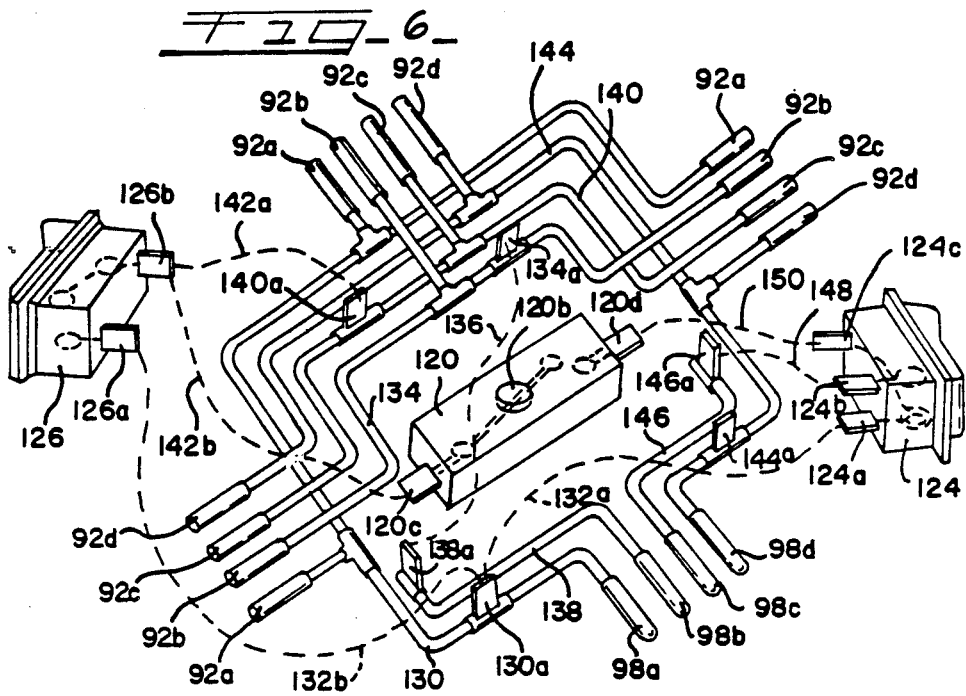
FIG-6-
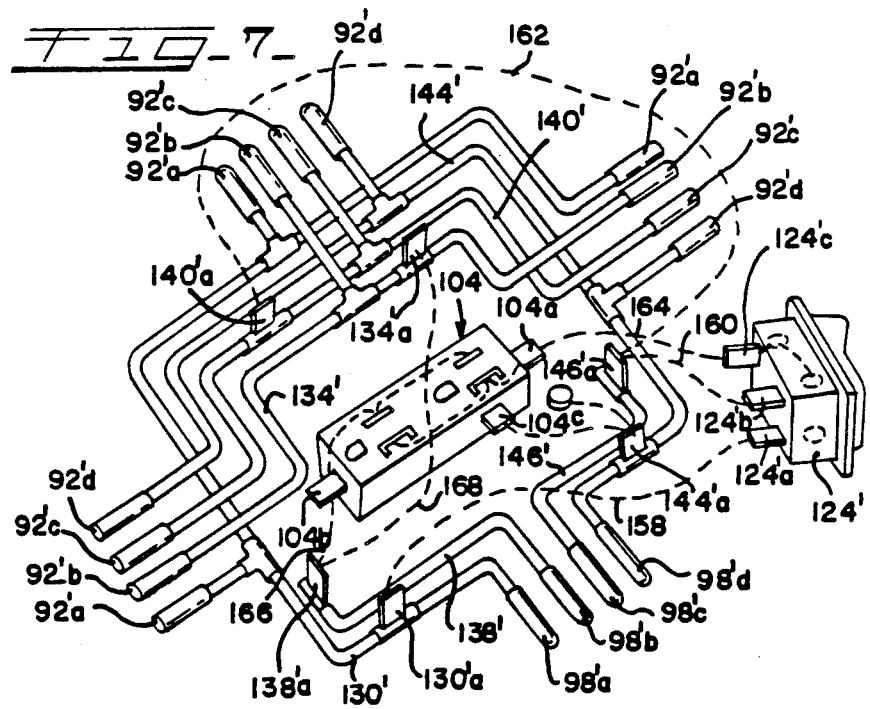
FIG-7-

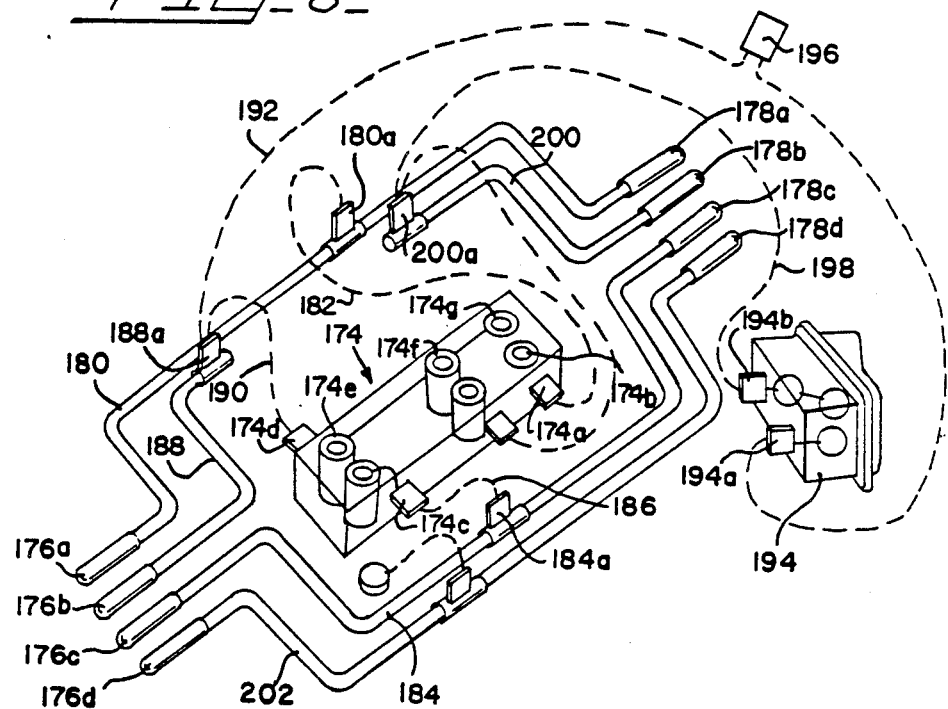
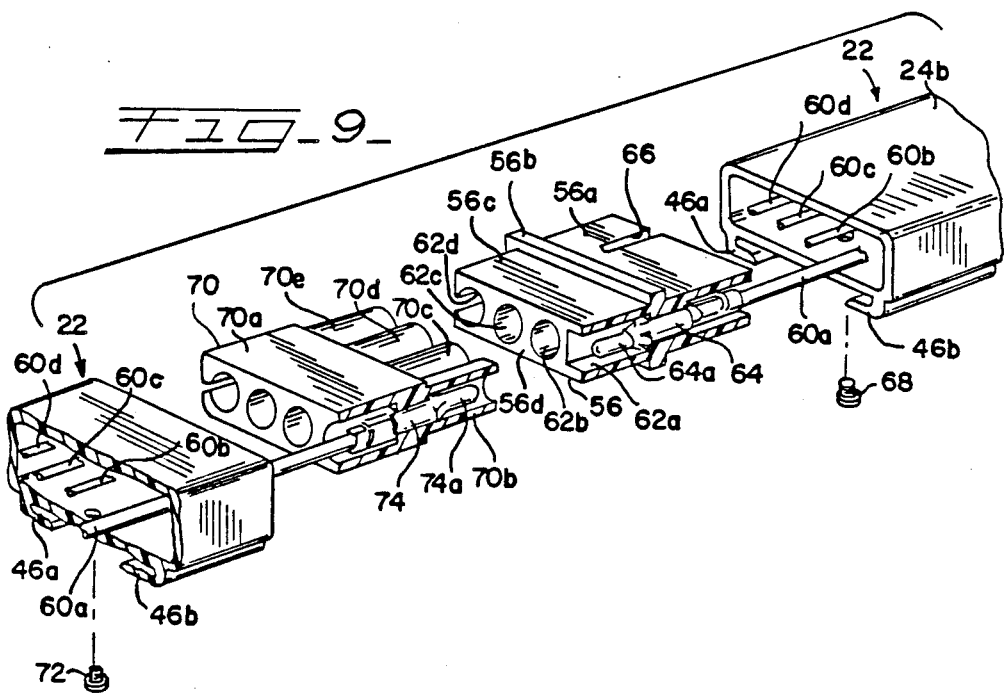

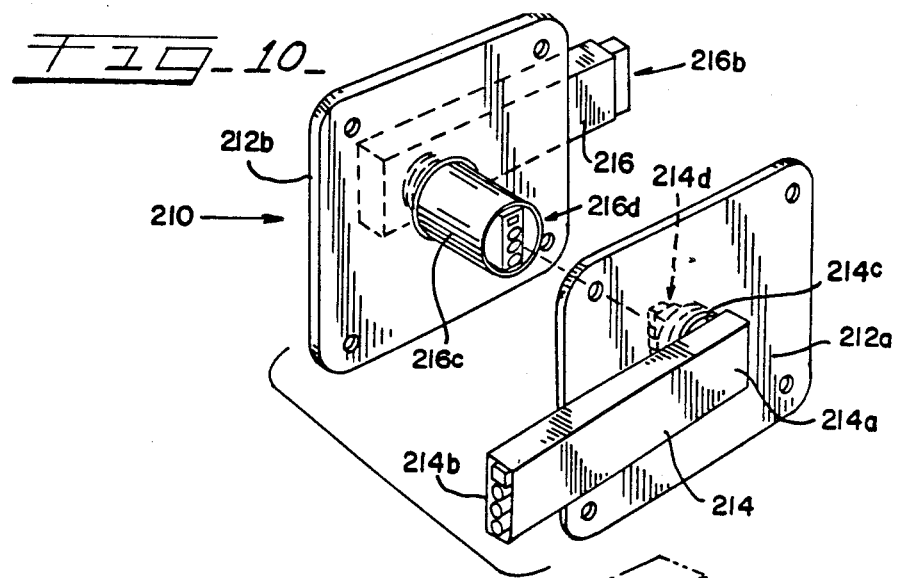
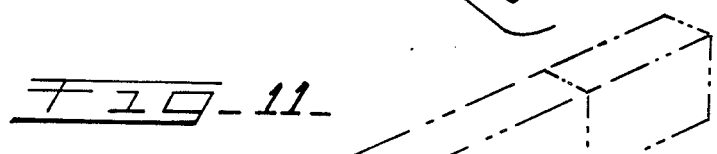
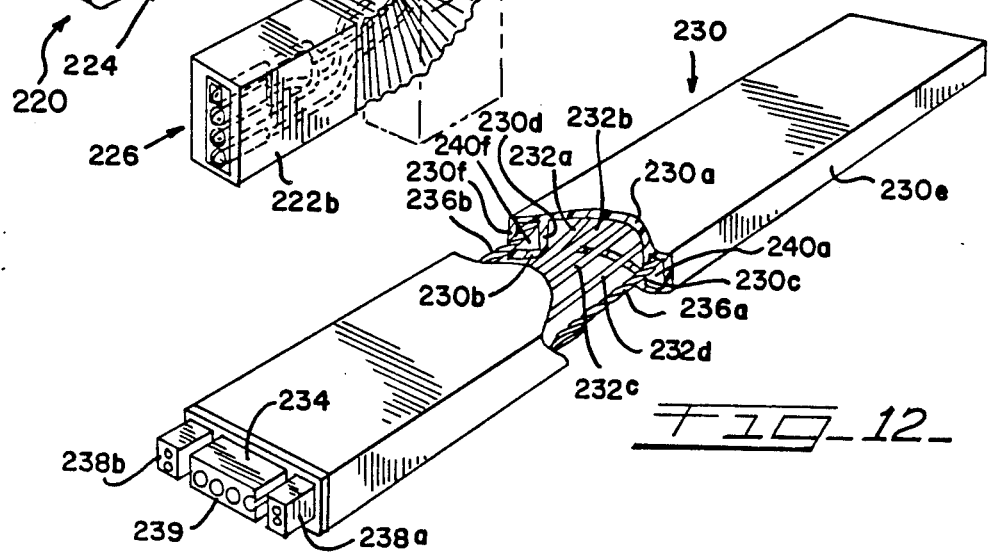

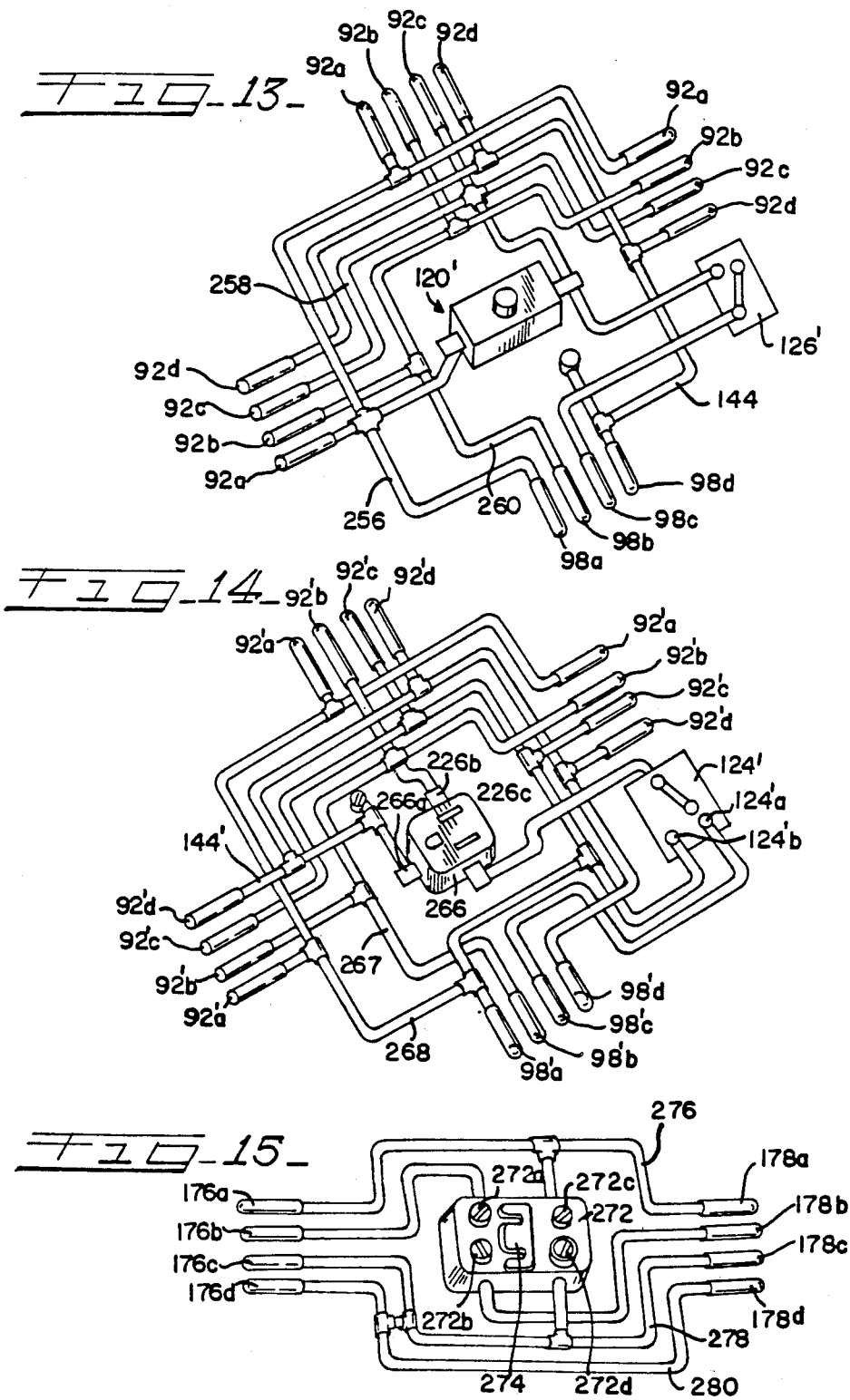

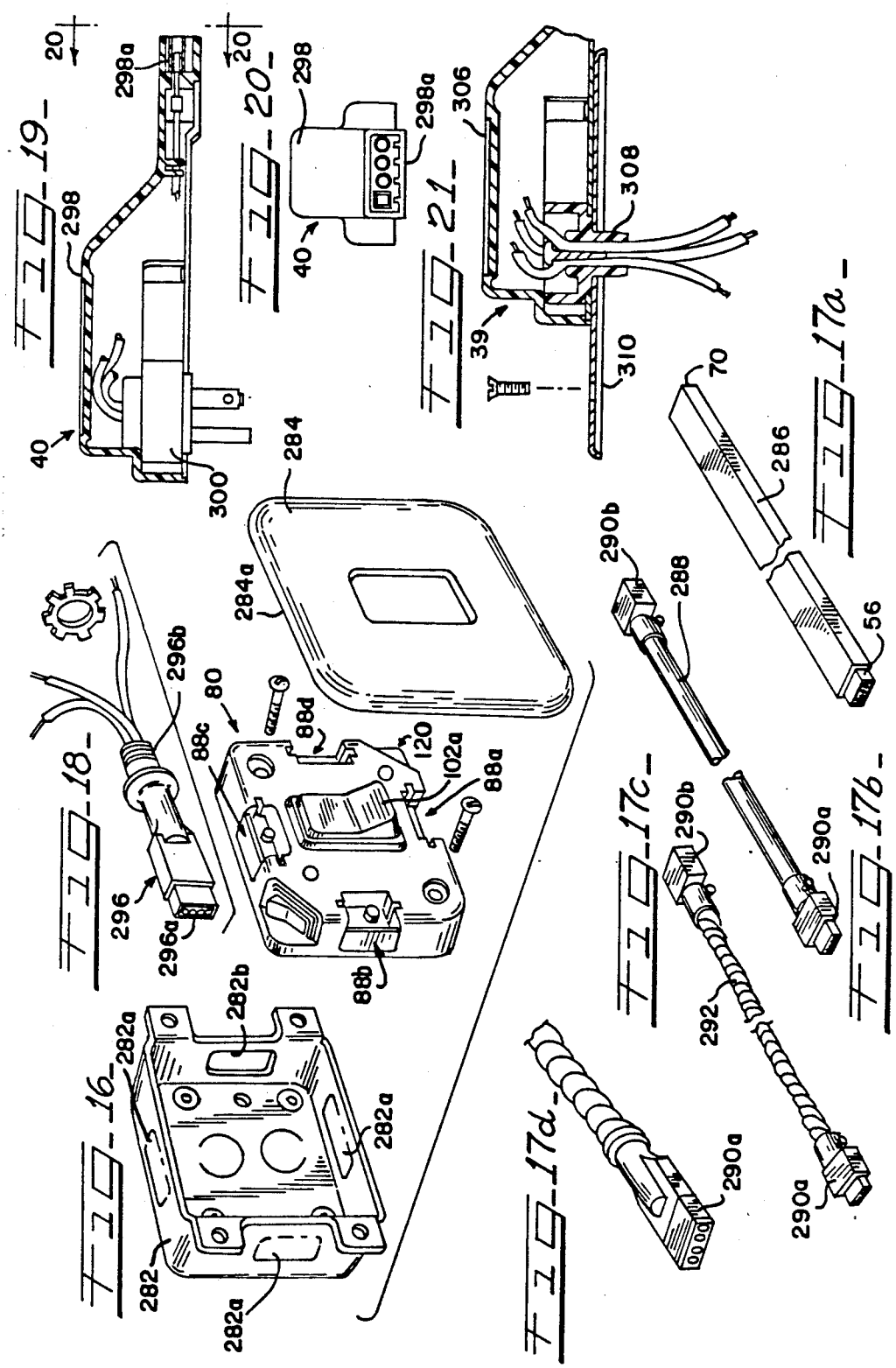

MODULAR ELECTRICAL CONDUCTOR SYSTEM

BACKGROUND OF THE INVENTION

The present invention relates generally to modular electrical conductor systems, and more particularly to a modular conductor system employing a plurality of novel modular elements adapted to be readily selectively connected in an electrical circuit by one having little knowledge of circuitry or conventional electrical component assembly and without being exposed to electrical hazards normally associated with conventional electrical systems.

Modular electrical systems which employ a plurality of discrete components or elements adapted for selective connection to establish desired electrical circuits are generally known. See, for example, U.S. Pat. Nos. 2,611,800 (Naughton), 3,546,360 (Bailey) and 3,659,247 (Chaney et al.). The system disclosed in the Naughton and Chaney et al. patents employ elongated members made of electrically non-conductive material which carry electrical conductors generally longitudinally therethrough and which facilitate connection of the conductor ends to modular elements such as switch control elements and electrical power takeoff or receptacle elements. The systems disclosed in the Naughton, Chaney et al. and Bailey patents, facilitate on-wall installation internally of a room to enable installation of an electrical circuit without use of in-wall conduit and associated receptacles as conventionally employed with new building structures. In the latter case, it is also known to provide a preformed electrical wiring system which includes preformed elongated non-conductive members in which electrical conductors are carried and which are adapted for connection to modular type plug-in circuit breakers, receptacles and control switches and the like in a manner to facilitate in-wall installation. See, for example, U.S. Pat. No. 3,715,627 to D'Ausilio.

A significant disadvantage of the known prior modular electrical conductor systems is that they require the installer to have a knowledge of conventional electrical circuitry design and installation techniques in order to properly plan, assemble and install the various components comprising the various modular systems. A further disadvantage of the known prior modular electrical conductor systems is that they generally expose the installer to potentially hazardous electrical conductors should power be applied to the system during and before complete installation, thus creating significant potential danger to the unknowing or amateur installer during installation of a circuit.

SUMMARY OF THE INVENTION

One of the primary objects of the present invention is to provide a novel modular electrical conductor system which permits a layman or amateur to readily accomplish circuit layout and installation with little knowledge of electric circuitry as required for conventional electrical circuit wiring, and which substantially eliminates electrical hazards existent with prior known modular electrical systems.

A more particular object of the present invention is to provide a novel modular electrical conductor system for electrical circuit wiring which includes one or more discrete elongated generally rectilinear track or carrier members and a plurality of modular electrical elements which are selectively connectable with the carrier members to establish a selected electrical circuit, the various carrier members and modular elements having preassembled electrical conductors carried therein such that ends of the conductors are adapted for mating electrical connection while being continually shielded from contact by the installer.

Another object of the present invention is to provide a modular electrical conductor system of the aforementioned type wherein prewired elongated carrier members and modular electrical elements are employed having mutually cooperable shielded male and female connectors which enable easy interconnection to establish a desired electrical circuit without exposing the installer to hazardous contact with live conductors, one embodiment of the system being particularly adapted for surface wall mounting while another embodiment facilitates in-wall installation.

Still another object of the present invention is to provide a novel modular electrical conductor system which may employ one or more prewired modular switch and/or receptacle elements having internal switch means operative to enable selective connection of internal conductors so as to vary circuit configurations as desired to create at least one primary circuit and selective auxiliary circuits.

A feature of the modular electrical conductor system in accordance with the present invention lies in the provision of prewired modular switch and receptacle elements which define four quadrant oriented multiple conductor male and female connector sites enabling the switch and receptacle elements to be connected in circuit with interposed multiple conductor elongated carrier members, and which facilitates provision of at least two power circuits through the system one of which may comprise an uninterrupted circuit to all four connector sites of each switch and receptacle element while another power circuit may be selectively switched to energize a subcircuit remote from the corresponding modular element.

Another feature of the invention lies in the provision of prewired modular electrical circuit components which facilitate coding in a manner to enable easy selective connection in various circuit configurations by a person untrained in electrical circuitry.

Further objects, features and advantages of the invention, together with the organization and manner of operation thereof, will become apparent from the following detailed description of the invention when taken in conjunction with the accompanying drawings wherein like reference numerals designate like elements throughout the several views.

BRIEF DESCRIPTION OF THE DRAWINGS

FIG. 1 is a perspective view illustrating a modular electrical conductor system in accordance with the present invention, the various components of the system being illustrated in separated positions;

FIG. 2 is a fragmentary perspective view illustrating a carrier or track member releasably secured to a support surface, the conductors being removed from the carrier member for purposes of clarity;

FIG. 3 is a transverse sectional view of the carrier member illustrated in FIG. 2, taken substantially along line 3—3 of FIG. 2;

FIG. 5 is an exploded perspective view of the modular element of FIG. 4 but taken from the bottom of the modular element;

FIG. 6 is a diagramatic view illustrating the internal circuitry of a modular switch element as illustrated in FIG. 4;

FIG. 7 is a diagramatic view illustrating the internal circuitry of an outlet receptacle employing a single internal actuator switch;

FIG. 8 is a diagramatic view illustrating the internal circuitry of a modular ceiling receptacle which may be adapted for three-way circuit operation;

FIG. 9 is an exploded perspective view illustrating male and female end connectors and associated conductor carrier members, portions being broken away for purposes of clarity;

FIG. 10 is a perspective view illustrating a through-the-wall element which may be used in the modular electrical conductor system of FIG. 1;

FIG. 11 is a perspective view of a conductor carrier member facilitating plug-in connection and having articulation capability; and FIG. 12 is a perspective view of a conductor carrier member constructed in accordance with an alternative embodiment of the invention and which includes low-voltage conductor lines for transmitting analog or digital signals or the like, portions being broken away for purposes of clarity;

FIG. 13 is a diagramatic view illustrating alternative internal circuitry for use in the modular switch element of FIG. 14;

FIG. 14 is a diagramatic view illustrating alternative internal circuitry for use in the modular receptacle outlet for of FIG. 4;

FIG. 15 is a diagramatic view illustrating alternative internal circuitry for a modular ceiling receptacle;

FIG. 16 is an exploded perspective view illustrating an in-wall housing or junction box and associated switch module and cover plate for use in an in-wall modular electrical system in accordance with the present invention;

FIG. 17a–d illustrate various prewired conductor track carriers for use with the in-wall modular electrical system in accordance with the invention;

FIG. 18 illustrates a connector for adapting a conventional in-wall electrical junction box for connection to a track member or modular junction housing as illustrated in FIGS. 16 and 17;

FIG. 19 is a longitudinal sectional view of the plug-in modular connecting device shown in FIG. 1;

FIG. 20 is an end view taken along line 20—20 of FIG. 19.

FIG. 21 is a longitudinal sectional view of the permanent modular in-wall plug connector shown in FIG. 1.

DESCRIPTION OF PREFERRED EMBODIMENTS

Figure 4:
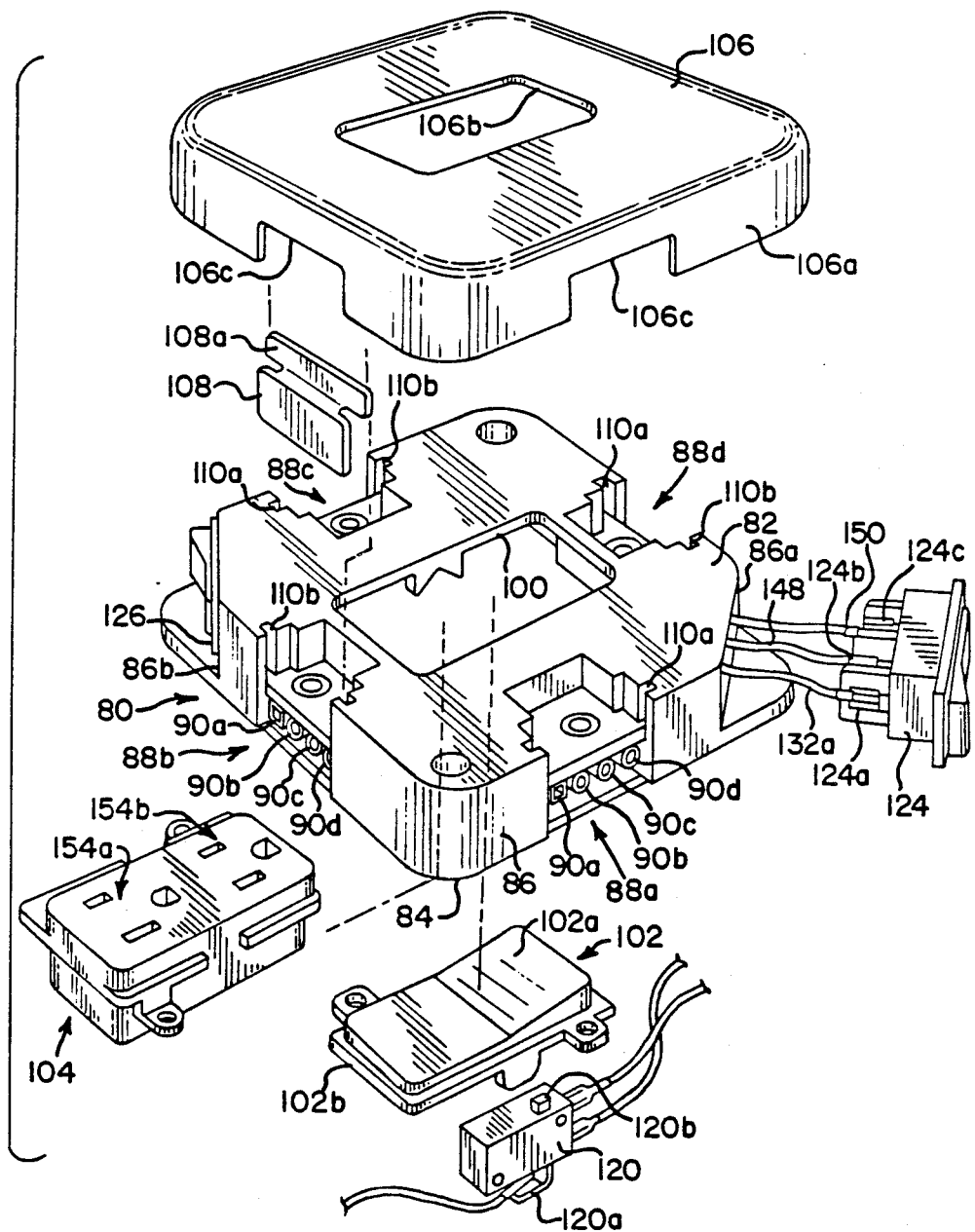
FIG. 4 is an exploded persective view of a modular element in accordance with the present invention which may take the form of a modular switch or outlet receptacle.

Referring now to the drawings, and in particular to FIG. 1, a modular electrical conductor system in accordance with the present invention is indicated generally at 20. The modular electrical conductor system 20, which may hereinafter be referred to as the conductor system, facilitates electrical circuit wiring by a person generally untrained in electrical circuitry design or installation and is shown, for purposes of illustration, with the various elements or components in unattached relation. In the embodiment illustrated in FIG. 1, the modular conductor system is particularly adapted for exterior surface wall mounting and includes a plurality of substantially closed carrier or track members, indicated generally at 22, which comprise straight or rectilinear carrier members and which may take varying lengths. Each of the carrier members 22 includes a tubular body 24 which is preferably formed as an extruded body, preferably of extruded aluminum, having a substantially rectangular transverse cross-section defined by a base or mounting wall 24a, an opposite outer wall 24b and lateral side walls 24c and 24d, as illustrated in FIGS. 2 and 3. As will be described more fully hereinbelow, each of the rectangular carrier members 22 is prewired so as to carry or support a plurality of elongated electrical conductors therein which extend longitudinally therethrough, the ends of the conductors terminating adjacent opposite ends of the corresponding carrier member. The carrier members 22 may be of different longitudinal fixed lengths as desired, or one or more of the carrier members may be formed as a variable length telescoping carrier member such as indicated at 22' in FIG. 1.

The modular conductor system 20 also includes a plurality of prewired modular electrical elements or components which, in the embodiment of FIG. 1, comprise a modular switch element, indicated generally at 28, a modular receptacle or outlet element, indicated generally at 30, and a modular ceiling plate element, indicated generally at 32. As will become more apparent hereinbelow, the modular switch element 28, receptacle element 30 and ceiling plate element 32 are adapted for plug-in connection with an end of a straight carrier or track section 22 or to a prewired corner element or member, such as indicated at 36, capable of being formed to 90-degree corner bends or other angular bends. As will become more apparent hereinbelow, the primary power supply to the modular conductor system 20 may be provided through either of the switch, receptacle or ceiling elements 28, 30, and 32, respectively, or power may be taken from a conventional wall outlet receptacle, as indicated at 38, of a conventional in-wall circuit by means of a wired-in connector module 39 or a plug-in connector module 40 adapted for plug-in connection to a carrier member 22 to provide power to the conductor system. Power to a carrier member 22, a corner member 36 or a selected one or more of a switch, receptacle or ceiling plate modules may also be provided by a plug-in cord connector as indicated generally at 42 in FIG. 1.

With particular reference to FIGS. 2 and 3, the carrier or track members 22 are adapted to be releasably affixed to a support surface, such as the exposed surface of a wall, ceiling or floor surface as indicated at 44 so as to maintain the prewired carrier members in desired position. To this end, the carrier members are formed with mutually opposed flanges 46a and 46b formed integral with the corresponding base wall 24a so as to establish mutually opposed and spaced mounting slots which define a T-shaped channel extending the full longitudinal length of the corresponding carrier member. The laterally opposed slots defined by flanges 46a, b are adapted to receive retaining fingers 50a and 50b of mounting brackets, one of which is indicated at 50, which are pivotally or rotatably secured to the mounting surface 44, as through mounting screws as shown at 52. Each mounting bracket 50 further has a pair of actuating fingers 50c and 50d which facilitates rotation of the mounting bracket by a generally flat tool such as the tip of a screwdriver or the like. If desired, the actuating fingers may be configured or sized so as to require a special flat-type tool for actuation, thereby preventing any manipulation of the mounting brackets by a child.

After determining a particular electrical circuit desired, a plurality of mounting brackets 50 are selectively mounted on the support surface on which the carrier members are to be secured such that the retaining fingers 50a and 50b received between the flanges 46a and 46b of a carrier member. The mounting brackets are then rotated at 90° to cause the retaining fingers 50a, b to enter the retaining slots defined by the flanges 46a, b and thereby releasably retain the carrier member in mounted position against the actuating fingers 50c, d.

As noted, the carrier members 22 carry a plurality of conductors therein which are adapted for plug-in connection to other carrier or track members or to the electrical elements 28, 30 or 32. Referring to FIG. 9, taken in conjunction with FIG. 1, each carrier member 22 has male and female end connectors affixed to its opposite ends such that the male end connector of each carrier member may be electrically interconnected to the female end connector of another carrier member or to a female connection site on a switch module 28, a receptacle module 30 for ceiling module 32. In the illustrated embodiment, each male end connector includes a generally rectangular housing 56 which is made of an electrically non-conductive material such as a suitable plastic. The housing 56 has an insert end 56a sized to be snugly received within an open end of a carrier member 22 in which the end connector is releasably retained by a lockscrew 68. The male end connector has a peripheral flange 56b formed thereon adapted to abut the outer end surface of the corresponding carrier member 22 so as to limit insertion of the male connector and thereby establish a predetermined length outwardly extending end 56c on the male end connector.

As aforementioned, each carrier member 22 carries a plurality of electrical conductors which are preassembled with the carrier member and associated male and female end connectors. In the illustrated embodiment, each carrier member 22 carries four conventional insulated electrical conductors therein such as indicated at 60a–d in FIG. 9. Conductors 60a, b and c preferably comprise No. 10 to 14 guage conductor wire while conductor 60d may comprise a No. 14 guage braided wire which serves as the earth ground for the system.

Each male end connector housing 56 has a plurality of longitudinal channels or passages therethrough, such as indicated at 62a–d in FIG. 9, at least one of which, such as 62a, has a substantially rectangular transverse configuration. An electrically conductive male pin connector is supported within each of the channels or passages 62a–d, such as represented at 64 in rectangular passage 62a in FIG. 9. Each of the male pin connectors is suitably connected, as by crimping, to an exposed end of a corresponding one of the electrical conductors 60a–d so as to be in electrical contact therewith. Preferably an exposed length of conductor wire, such as braided 14 guage wire, is crimped to the pin connector within passage 62d and extends into a groove 66 formed in the connector housing insert end 56 a so as to contact the metallic carrier member 22 and facilitate grounding thereof. Each male pin connector 64 has an outer cylindrical end 64a terminating in a semi-spherical end spaced inwardly or rearwardly from the end surface 56d on the end connector housing.

The end of each carrier member 22 opposite the male end connector 56 has mounted thereon a female end connector, as indicated at 70 in FIG. 9, which facilitates releasable electrical interconnection with a male end connector on another axially aligned carrier member. As will become more apparent hereinbelow, the male and female end connectors 56 and 70 are also adapted for releasable electrical connection with selected connector sites on the switch element 28, receptacle element 30, ceiling element 32, and power take-off module 40. Referring to FIG. 9, each female connector 70 is made of a non-conductive material, such as a suitable plastic, and has a generally rectangular insert end 70a adapted to be inserted with an end of a carrier member 22 and releasably retained therein through a locking screw 72 similar to the locking screw 68. The female end connector 70 includes a plurality of forwardly projecting bosses, there being four indicated at 70b–e, having outer peripheral surface configurations adapted to be snugly received, respectively, within the four channels 62a–d within the outer end 56c of a male end connector 56. Thus, boss 70a has a generally rectangular outer surface configuration facilitating entry within the rectangular channel 62a. The female end connector 70 is inserted within the end of the associated carrier member 22 such that the outermost end surfaces of the bosses 70b–e lie generally coplanar with the top edge surface of the carrier member.

Each of the bosses 70b–e defines an internal generally cylindrical passage which extends through the insert end 70a. A female pin connector, such as indicated at 74 in FIG. 9, is supported within each of the passages 70b–e such that a cylindrical tubular connector end 74a of each female connector pin receives a corresponding male connector pin end 64a when the end connectors 56 and 70 are interconnected such that the bosses 70b–e are received, respectively, within the passages 62a–d in the male end connector 56. The outermost ends of the tubular portions 74a of the female connector pins 74 are spaced inwardly or rearwardly from the outermost edges of their corresponding bosses so that contact with mating male connector pins 64a is not made until the bosses 70b–e have entered the passages or channels 62a–d in the male end connector 56. In this manner, the connector pins 64 and 74 are continually shielded during interconnection so as to prevent exposure of the installer to accidental contact with a current carrying conductor.

As aforementioned, one feature of the electrical conductor system 20 lies in the provision of the modular switch and receptacle elements 28 and 30 which are adapted for selective plug-in connection to the male and female end connectors on the carrier members 22. Referring particularly to FIGS. 4–7, the modular switch and receptacle elements are generally similar in their structural configurations and may employ several components common to each other. With particular reference to FIGS. 4 and 5, both the switch and receptacle elements 28 and 30 include a modular base housing, indicated generally at 80, which may be made of a suitable molded non-metallic and non-conductive material, such as a suitable plastic material, and has a relatively low elevational profile. The base housing 80 has an upper substantially planar wall 82 and a lower edge surface 84. The base housing 80 is generally square in plan configuration and has a peripheral side wall 86 formed normal to the plane of the upper wall 82 and defining four sides of the base housing. The base housing 80 defines four connector sites, indicated at 88a–d, each of which is formed generally mid-length of a side surface of the housing. Three of the connector sites, such as 88a, b and c, are formed as female connector sites and each has four spaced tubular bosses, such as indicated at 90a–d, which are similar to the bosses 70b–e formed on the female end connectors 70. The bosses 90a–d are adapted to be received within the passages 62a–d of a male end connector 56 to facilitate connection therewith, and each boss 90a–d has a female connector pin, such as indicated at 92a–d in FIG. 5, supported in generally concentric relation therein similar to the female connector pins 74 within the female end connector 70.

The fourth connector site 88d of the base housing 80 defines a male connector site having a projecting boss 96 in which is formed three cylindrical bores or passages 96a–c and a generally rectangular passage 96d which, as illustrated in FIG. 5, are substantially identical in configuration to the passages 62a–d formed in the male end connector 56. Each of the passages 96a–d has a male pin connector, such as indicated at 98a–d in FIG. 5, supported therein in similar fashion to the male pin connectors 64 so as to facilitate electrical interconnection with a female end connector 70.

The base housing 80 has a generally rectangular opening 100 formed in the upper wall 82 which is sized to receive either a rocker assembly 102 or a receptacle or electrical plug receiving block 104. The rocker assembly 102 includes a rocker actuator 102a and a rocker actuator frame 102b on which the rocker actuator 102a is pivotally supported. The frame 102b is adapted to be affixed to the base housing 80, as through the mounting screws or the like (not shown), such that the rocker actuator extends upwardly through the opening 100. With the rocker assembly 102 mounted on the base housing 80, a generally rectangular cover member 106 having a peripheral skirt 106a is adapted to be mounted over the base housing 80 such that a rectangular opening 106b in the cover receives the rocker actuator 102a therethrough. The cover skirt 106a is adapted to provide a snug but releasable snap-on retention fit with the base housing.

Referring particularly to FIG. 4, each of the connector sites 88a–d on the base housing 80 is adapted to be selectively covered when not in use by a cover plate, one of which is illustrated at 108. Each cover plate 108 is generally rectangular and of sufficient length and height to engage the outer surface of the side wall 86 adjacent a selected connector site, such as 88b. Each cover plate is adapted to be releasably retained in position covering an associated connector site on base housing 80 by a retainer flange 108a which is preferably integrally connected to the corresponding cover plate 108 and is spaced therefrom such that opposite ends of the retainer flange are received within a pair of mutually opposed grooves or slots 110a, b formed in the base housing adjacent the corresponding connector sites 88a–d. The cover member 106 has a recess 106c formed mid-length of each side of the skirt 106a so that each cover plate 108 is snugly received within a corresponding cover recess 106c and lies coplanar with the cover skirt when mounted on the base housing. Each recess 106c and cover plate 108 is of sufficient size to expose the associated connector site when the cover plate 108 is removed.

A metallic base plate 114 is adapted to be mounted on the base housing 80 by screws (not shown) inserted through suitable openings 114a in the base plate and into mounting bosses 116a and 116b formed integral with the molded base housing, as shown in FIG. 5. A second pair of openings 114b in the base plate 114 are positioned for alignment with a second pair of mounting bosses 118a, b on the base housing to facilitate mounting of the switch or receptacle module onto a support surface, it being understood that such mounting is effected before the cover 106 is placed on the base housing. With the rocker actuator assembly 102 mounted on the base housing 80 for purposes of establishing a modular switch element, a primary on-off electrical switch, such as indicated at 120 in FIG. 4, is mounted through a mounting bracket 120a to the base plate 114 such that a switch actuator button 120b underlies and is actuated by pressing the rocker actuator 102a, as is known.

In accordance with one feature of the modular switch element 28, the switch element is prewired internally thereof with a plurality of conductors and includes at least one, and preferably two, internal switches which enable selective connection of the various internal conductors for establishing selective primary and secondary or auxiliary circuit combinations. With particular reference to FIG. 6, taken in conjunction with FIGS. 4 and 5, the various male and female pin connectors 92a–d and 98a–d are connected in conductor harness assemblies which in turn are adapted to be selectively interconnected through the aforementioned single pole/single throw switch, indicated schematically at 120 in FIG. 6, a single pole/double throw switch 124 and a single pole/single throw switch 126. As best illustrated in FIG. 6, the female pin connectors 92a and the male pin connector 98a are connected to a common insulated conductor 130 which establishes a primary power conductor harness subassembly. A spade connector 130a is connected to the conductor 130 and facilitates electrical connection thereof to a switch contact 124a of switch 124 through one leg 132a of a conductor harness 132 having a second leg 132b interconnecting the spade connector 130 to a switch contact 126a of switch 126.

The female pin connectors 92b are electrically interconnected through an insulated conductor 134 which forms a secondary or auxiliary conductor harness subassembly. A spade connector 134a on conductor 134 electrically interconnects pin connectors 92b to the male pin connector 98b through a conductor harness 136 connected at one end to the spade connector 134a and connected at its opposite end to a spade connector 138a. The spade connector 138a is affixed to an insulated conductor 138 to form a conductor harness subassembly which includes the male pin connector 98b.

The female pin connectors 92c are electrically interconnected through an insulated conductor 140 which forms a further secondary or auxiliary conductor harness subassembly having a spade connector 140a which facilitates connection of connectors 92c to a switch contact 126b of switch 126 through a leg 142a of a connector harness 142. The switch contact 126b is also electrically connected to a switch contact 120c of switch 120 through a second leg 142b of the connector harness 142. The female pin connectors 92d are electrically interconnected to each other and to the male pin connector 98d through a conductor harness subassembly which includes an insulated conductor 144 which defines an earth ground peripheral circuit adapted to be connected to the metallic base plate 114 as through a spade connector 144a and a suitable ground conductor (not shown). The male pin connector 98c is connected to an insulated conductor 146 which forms a conductor harness subassembly having a spade connector 146a which facilitates electrical connection of connector pin 98c to a switch contact 124b of switch 124 through a connector harness 148. The switch 124 is also connected through a switch contact 124c to a switch contact 120d of switch 120 through a conductor harness 150.

As illustrated in FIG. 4, the internal switches 124 and 126 are preferably of the rocker type and are mounted on diagonal corners 86a and 86b formed on the base housing 80 so as to be normally unexposed when the cover member 106 is mounted on the base; openings are provided on the base 106 to receive the switches 124 and 126 such that the associated connector harnesses, as indicated at 132a, 148 and 150, are disposed internally of the base housing. In this manner, the switch 120 and associated rocker control 102 serve as a primary exposed switch, and the switches 124 and 126 serve as unexposed secondary or auxiliary switches.

With the modular switch 28 having internal circuitry and control switches 124 and 126 as described, the modular switch offers three optional modes, generally termed "in-line", "power return" and "new-switch" operational modes. In the in-line mode, the switch 28 is connected to a power source, such as the female end connector 70 of a carrier member 22, so that the male connector pins 98a and 98c are electrically energized. With cover 106 removed, the auxiliary switch 124 is operative to interconnect connector 98c to switch 120 which is operative to control power to the femal pin connectors 92c via the conductor harness 142a such that the primary switch 120 may operate a trunk or primary circuit for distribution through the female pin connectors 92c. Power applied to the pin connector 98a is continually carried to the female pin connectors 92a through the primary power circuit harness 130.

In a power return mode, the circuit is designed so that power is brought from a location at or near the apparatus to be energized and applied to the male connector pin 98a, again as through a carrier member 22, which creates a constant power state in the female terminals 92a. Simultaneously, power is applied by the conductor harness leg 132b to auxiliary switch 126 which is selectively operable to apply power to primary switch 120 which, in turn, is operable to selectively control power to the male pin connector 98c through selective operation of the auxiliary switch 124. Power may be taken from connector pin 98c back to the positive terminal of the apparatus to be energized upon selective actuation of the auxiliary switches 124, 126 and the main or primary control switch 120, thereby facilitating control of power to the controlled apparatus. Male connector pin 98b is connected to the external circuit neutral conductor line and, through conductor 136, establishes a similar neutral conductor condition for the female pin connectors 92b.

In the new switch mode, power is applied to the male connector pin 98a from which it is passed to the switch 124 via conductor 132a such that selective operation of auxiliary switch 124 effects power to the primary switch 120 which in turn controls power to the female pin connectors 92c for switched power transmission to carrier members 22 connected to the connector sites 88a-c for one or more power circuits downstream from the particular switch module 28.

As aforementioned, the modular receptacle or outlet element 30 may also utilize the base housing 80 as described for the modular switch element 28, including the connector sites 88a-d, the cover 106, coverplates 108 and base plate 114. When employed as a modular receptacle, the receptacle or plug receiving block 104 is suitably mounted within the opening 100 in the base housing 80 similar to mounting of the rocker assembly 102. The receptacle 104 preferably has two electrical plug receiving sites, indicated generally at 154a and 154b in FIG. 4, for receiving polarized plugs having grounding prongs of conventional design.

With particular reference to FIG. 7, taken in conjunction with FIGS. 4 and 5, when employing the base housing 80 for the modular receptacle 30, a plurality of conductor harnesses are supported within the base housing which are substantially identical to the conductor harnesses utilized in the modular switch element 28. The conductor harnesses employed in the receptacle 30 are represented by primed reference numerals corresponding to the reference numerals used in FIG. 6 for corresponding conductor harnesses. Thus, the conductor harnesses illustrated in FIG. 7 are indicated at 130', 134', 138', 140', 144' and 146'. Similarly, corresponding male and female pin connectors are indicated at 92'a-d and 98'a-d, the various male and female pin connectors being adapted for mounting within the base housing 80 at the corresponding connector sites 80a-b as in the modular switch element 28.

A single pole/double throw switch 124' is adapted to be mounted on a diagonal corner of the base housing 80 in similar fashion to mounting of switch 124 on the base corner 86a. Switch 124' has a switch contact 124'a connected to a spade connector 130'a on the conductor harness 130' through a suitable conductor as indicated schematically at 158 in FIG. 7. A switch contact 124'b of switch 124' is electrically connected to the male pin connector 98' through a conductor, indicated schematically at 160, connected between contact 124'b and spade connector 146'a. The spade connector 146'a and pin connector 98'c are connected to the conductor harness subassembly 140' through a suitable conductor, indicated schematically at 162, having its opposite end connected to a spade connector 140'a on the harness subassembly 140'. The common contact 124'c of switch 124' is connected to a contact 104a on the receptacle block 104 through a conductor as indicated schematically at 164, the positive terminal 104a being also connected to the positive terminals of the receptacle. The ground contact 104b of receptacle 104 is connected to the ground male connector pin 98b through a conductor 166, the ground contact 104b being also interconnected to the neutral receptacle contacts. The neutral pin 98'a is also connected to the neutral female connectors 92'b through a conductor 168.

With the receptacle element 30 as thus described, electrical power connected to the male pin connectors 98'a and 98'c, as from a carrier member 22, causes power to be applied to both terminals 124'a and 124'b of switch 124', while power is also applied from male connector pin 98'c to female pin connectors 92'c through the conductor harness subassembly 140'. The switch 124' is selectively operable to power the receptacle 104 which is connected to the neutral male pin connector 98'b along with the female pin connectors 92'b, the female pin connectors serving as connection points for additional carrier members and modular switch and receptacle elements downstream from the modular receptacle under consideration. Male connector pin 98'd serves as the earth ground circuit and is connected to a contact 104c of receptacle 104 and to the metallic base plate 114.

FIG. 8 illustrates in somewhat schematic fashion the internal circuitry for the modular ceiling plate element 32 which, as aforedescribed in connection with FIG. 1, is adapted to be mounted on a ceiling surface and provides a modular element to which prewired track or carrier members 22 may be electrically connected in plug-in fashion. The modular ceiling element 32 includes a connector core, indicated schematically at 174 in FIG. 8, which has an outer configuration generally similar to the aforedescribed receptacle 104 and is adapted to be mounted within the opening 100 in a base housing 80 as employed with the modular switch element 28 and a modular receptacle 30. When employing the base housing 80 in the modular sealing element 32, only two connector sites, a male connector site and a female connector site, such as indicated at 88a and 88b in FIG. 4, are employed and the electrical circuitry within the base housing is modified such as illustrated schematically in FIG. 8. To this end, the internal circuitry for the modular ceiling element includes four male pin connectors 176a-d and four female pin connectors as indicated at 178a-d. Male pin connector 176a is connected to the female pin connector 178a through an insulated conductor 180 which forms a connector harness with the associated male and female pin connectors and has a spade connector 180a connected through a conductor, indicated schematically at 182, to a contact 174a of the connector core 174. Contact 174a is internally connected to a connection outlet 174b which along with other outlets in the connector facilitates connection of electrical appliances, such as ceiling fans and the like or power wires, to the ceiling module. Male pin connector 176a may be powered through connection to a prewired carrier member 22 in similar fashion to powering of the modular switch and receptacle elements.

Male pin connector 176c of the ceiling module may also be connected to power through the associated carrier member 22, and is connected to the female pin connector 178 through an insulated conductor 184 which forms a conductor harness having a spade conductor 184a connected thereto and which in turn is connected to a contact 174c of the connector core 174 through a conductor 186. Contact 174 is similarly connected to an outlet in the connector core. Male pin connector 176b forms part of a connector harness 188 which has a spade connector 188a connected to a contact 174d on the connector core through a conductor 190. Pin connector 176b forms the neutral conductor of the ceiling module circuit such that contact 174d forms the neutral contact of the connector core, contact 174d being connected in common with wire connecting outlets 174e, f and g. The spade conductor 188a is also connected through a conductor 192 to a switch contact 194a of a single pole/single throw switch 194 which forms an internal circuit isolating switch adapted to be mounted on a diagonal corner of the base housing 80 in similar fashion to the aforedescribed mounting of switch 124. A suitable circuit protecting device, such as a fuse 196, is connected in series with the conductor 192. The switch contact 194b is connected through a conductor 198 to a space conductor 200a of a conductor harness 200 which includes the female pin connector 178a. The fuse 196 serves to prevent shorting in the event the outgoing neutral circuit through female pin connector 178b is employed as a return hot line for a 3-way circuit and the isolating switch 194 is inadvertently turned on. An earth ground conductor harness 202 includes the male pin connector 176d and female pin connector 178d and facilitates connection to the metallic base plate 114 of the ceiling module to effect an earth ground therewith.

FIG. 10 illustrates a modular through-the-wall connector arrangement for passing a circuit, or leg of a circuit, forming a portion of the modular conductor system 20 through a wall or the like, as when passing the circuit between two rooms in a building. The through-the-wall connector assembly is indicated generally at 210 in FIG. 10 and includes a pair of mounting plates 212a and 212b each of which is adapted to be mounted flush against a wall surface such as through suitable mounting screws or the like (not shown). A generally rectangular shaped connector member 214 is rotatably mounted at one end 214a to the mounting plate 212a in a manner to facilitate about 358° swivel rotation. The carrier member 214 has a female end connector or adapter 214b at the end thereof opposite its pivotal or swivel connection to the mounting plate 212a, the female end connector being substantially identical to an end connector of a carrier member 22 having a female end connector 70 mounted therein for selective cooperation with a male end connector 56 on a carrier member 22 or for connection to a male connector site on a modular element, such as illustrated at 88a on the base housing 80 in FIG. 4.

The carrier member 214 has a generally cylindrical neck portion 214c which passes through and is rotatable within a suitable opening generally centrally of the mounting plate 212a, the neck 214c terminating at its outermost end in a male end connector, indicated generally at 214d, which is substantially identical to a male end connector 56 so as to facilitate coupling with a female end connector, indicated generally at 216d, formed on an end 216c of a rectangular carrier member 216 which passes through a generally central opening in the mounting plate 212b. The outer end of the carrier member 216 has a male end connector, indicated generally at 216b, which is adapted for electrical connection with a female end connector 70 on a carrier member 22 or for coupled relation with a female connector site, such as indicated at 88c-d, on the base housing 80 employed with the modular switch and receptacle elements 28 and 30, respectively. The neck end 216c is preferably adapted for telescoping relation to accommodate different width walls, and with the neck portion 214c forms electrical coupling means spanning the space between the wall surfaces on which the mounting plates 212a, b are mounted. The rectangular carrier members 214 and 216 carry suitable conductors therein which have their opposite ends connected to pin connections carried within the end connectors 214b, 214d, 216d, and 216b in similar fashion to the conductors carried by the carrier members 22.

FIG. 11 illustrates a plug connector, indicated generally at 220, which may be employed to interconnect a conventional receptacle outlet to either carrier member 22 or a selected modular switch or receptacle element 28 or 30. The plug connector 220 includes a pair of generally rigid rectangular carrier end sections 222a and 222b which are formed integral with an intermediate corrugated section 222c. The carrier end sections 222a and 222b and the corrugated section 222c are preferably formed of a suitable plastic material which enables flexing or articulation of the corrugated section such that the carrier ends 222a and 222b may be moved between substantially axially aligned positions, as shown in phantom, and positions wherein either of the carrier ends is disposed 90° or 180° from its axially aligned position with the other carrier end. The carrier end 222a preferably carries a conventional three-prong plug, indicated generally at 224, which facilitates plug-in connection to a convention electrical outlet. The plug connector 220 carries at its free end a female connector, indicated generally at 226 adapted for electrical coupled relation with the male end connector 56 on a carrier member 22 or for connection to a male connector site, such as indicated at 88a, on a modular switch or receptacle element. The corrugated section concept employed with the plug connector 220 may be similarly employed with other prewired electrical conductor carrier members of the modular electrical conductor system 20 to facilitate orientation in more than one plane.

FIG. 12 illustrates an alternative carrier member, indicated generally at 230, which may be utilized in a circuit design employing modular elements in accordance with the present invention. The carrier member 230 is generally similar to the aforedescribed carrier members 22 in carrying four conductor elements, indicated generally at 232a–d, which are connected at their opposite ends to suitable male and female pin connectors housed within male and female end connectors, as represented by the male end connector 234 in FIG. 12. The conductor elements 232a–d extend longitudinally of and are isolated within a closed longitudinal chamber or passage 235 defined internally of the carrier member 230 by parallel upper and lower walls 230a and 230b, respectively, and laterally opposed internal longitudinal partition walls 230c and 230d. The partition walls 230c and 230d are substantially parallel and preferably have their longitudinal marginal edges formed integral with the walls 230a, b, as shown in FIG. 12. In addition, the carrier member 230 carries two pairs of smaller guage wires which are twisted into auxiliary longitudinal conductor pairs illustrated at 236a and 236b, which extend in full longitudinal length of the carrier member 230 and terminate at their opposite ends in male and female end connectors, the male end connectors being illustrated at 238a and 238b, respectively. The pairs of smaller guage conductors 236a, b extend longitudinally within respective isolated chambers or passages 240a and 240b which, in the illustrated embodiment, extend along the marginal longitudinal edges of the carrier member 230 and are defined by the upper and lower walls 230a, 230b, the internal partition walls 230c, d, and corresponding outer side walls 230e and 230f which preferably have their longitudinal edges formed integral with the upper and lower walls 230a, b so as to establish closed passages 240a, b. The conductors 236a, b are adapted to transmit analog or digital signals and thereby facilitate use of the carrier member 230 in circuits employing both primary power and low voltage signal carriers as in analog and digital circuits. The small guage conductor sets 236a and 236b are preferably twisted for purposes of emission isolation. If desired, a modular electrical element may be employed to suppress, react to or serve as a gate to the analog or digital signals transmitted through the conductor sets 236a, b and further pass the analog and/or digital signals to series connected similar track sections to ultimate user components of the analog or digital signals.

Referring again to FIG. 1, a test light, indicated generally at 242, is preferably provided with the modular electrical conductor system 20 to facilitate checking of the various modules, such as the switch, receptacle and ceiling modules, during installation to assure that they have been properly powered. To this end, the test light 242 includes a generally rectangular housing 244 having a lens 244a affixed on one end and having a male end connector 244b secured to the other end in a manner to enable the male end connector to be inserted into a female connector site on a switch, receptacle or ceiling module or to the female end connector on a track or carrier section 22. A suitable light bulb and associated circuitry are supported internally of the test light 244 with the internal circuit being connected to the male end connector so as to facilitate checking the various modular components for electrical power during installation.

Preferably, the modular components of the conductor system 20 also include a 4-way connecting device of module 248 adapted to serve as a three-way or four-way junction for the track or carrier members 22, as when creating a "T" or "X" circuit juncton. To this end, the connecting module 248 is generally rectangular in plan configuration and has a low-profile housing cover 250 which covers a rectangular base housing (not shown) and which has an opening generally centrally of each of its peripheral side walls to expose a connector site on each side of the base housing. Two such connector sites are shown at 252a and 252b and are substantially identical to the connector sites on the base housing 80 employed with the switch and receptacle modules 28 and 30, respectively.

FIGS. 13, 14 and 15 represent alternative internal circuit configurations for the switch, receptacle and ceiling modules, respectively, and which are simplified from the circuitry of the aforedescribed modules 28, 30 and 32. Elements of the circuits shown in FIGS. 13–15 which correspond to the aforedescribed internal circuits or conductor harnesses for the switch, receptacle and ceiling modules, such as the male and female pin connectors, are identified in FIGS. 13–15 with identical reference numerals.

Referring to FIG. 13, the alternate simplified circuitry for the aforedescribed switch module 28 is adapted to be employed with the aforedescribed base housing 80 and includes a single pole/single throw switch, indicated schematically at 120', adapted to be mounted on a base housing 80 so as to be accessible for actuation by a rocker assembly in similar fashion to the aforedescribed switch 120. The alternate switch module circuitry of FIG. 13 employs a single hidden auxiliary single pole/single throw switch 126' which is adapted to be mounted on a corner of the base housing 80 in similar fashion to the aforedescribed switch 124 illustrated in FIG. 6 so as to be covered by the removable cover member 106. An electrical conductor harness which includes a conductor line 256 having operative connection to the male pin connector 98a and female pin connectors 92a serves as a primary or main power line and is connected to the switch 120', termed with the main switch, which controls power to the switch 126' and to female pin connectors 92c through a conductor harness 258. A neutral conductor harness 260 having female pin connectors 92b and male pin connector 98b, and an earth ground conductor harness 144 which includes female pin connectors 92d and male pin connector 98d are provided in the switch circuitry of FIG. 13 in similar fashion to the corresponding neutral and earth ground conductors described in respect to the circuit of FIG. 6.

The alternate modular switch circuit of FIG. 13 operates as a simple line switch in which the normally hidden or shielded auxiliary switch 126' enables two operational modes defined as the "line/power return" and the "line/new switch" modes. In the line/power return mode, the auxiliary switch 126' is closed or turned on so that power from the main control switch 120' may be passed to the male pin connector 98c to facilitate power return on a switched conductor line. In the line/new switch mode, the auxiliary switch 126 is opened so as to isolate the pin connector 98c from any switched power which may be applied to pin connector 98c as an auxiliary power supply, thus allowing the main switch 120' to a control a discrete switched circuit through the female pin connectors 92c.

The alternate receptacle module circuitry illustrated in FIG. 14 includes a standard three-prong receptacle 266 which is adapted to be mounted in the base housing opening 100. This circuit includes an earth ground terminal 266a which is connected to an earth ground conductor harness 144' having the female pin connectors 92'd and a male pin connector 98'd. A neutral terminal 266b of the receptacle 266 is connected to a neutral conductor harness 267 which includes the female pin connectors 92'b and the male pin connector 98'b. The receptacle 266 includes a power terminal 266c which is connected to a single pole/double throw switch 124' adapted to be mounted on a beveled corner surface 86a of a base housing 80 so as to be hidden by the cover member 106 when mounted on the base housing. Switch terminals 124'a, 'b are connected, respectively, to the male pin connector 98'c and to the main power conductor harness 268 which includes the female pin connectors 92'a and the male pin connector 98'a.

As with the aforedescribed receptacle module circuit illustrated in FIG. 7, the receptacle module employing the circuitry as illustrated in FIG. 14 is preferably color coded to facilitate ready identification of the various conductor harnesses and thus assure proper connection by one unskilled in circuit design or installation from simple instructions provided with the molular system. The receptacle circuit illustrated in FIG. 14 facilitates connection in a modular circuit, either singly or in tandem, with switch 124' being operative to determine whether the receptacle 266 receives constant power from the primary power harness 268 or receives switch controlled power from the auxiliary male pin connector 98c', such that power to the receptacle can be controlled from any circuit direction.

FIG. 15 illustrates an alternative and simplified circuit for the modular ceiling plate element 32 to facilitate modular circuit connection of an electrical device such as a fan or fixture to a ceiling mounted power supply. As with the aforedescribed modular ceiling plate element 32, the circuitry of FIG. 15 is adapted to be mounted within a modular base housing 80 so as to utilize, for example, a female connector site 88b and a male connector site 88d. The alternate circuitry illustrated in FIG. 15 includes a connector core 272 adapted to be mounted within the opening 100 in the base housing 80 for exposure through the opening 106b in the cover member 106 when mounted on the base housing.

The alternate circuit of FIG. 15 eliminates the auxiliary switch indicated 194 in the ceiling plate module circuit illustrated in FIG. 8 and employs a conductive crossbar or plate 274 adapted to interconnect neutral terminals 272a and 272b on the connector core 272 during selected modes of operation. The neutral terminal 272a is connected to a male pin connector 176b and the terminal 272b is connected to a female pin connector 178b. A power terminal 272c on the connector core 272 is connected through a conductor harness 276 to a male pin connector 176a and a female pin connector 178a. A second power terminal 272d on the connector core 272 is connected to a conductor harness 278 which includes the male pin connector 176c and the female pin connector 178c. An earth ground conductor harness 280 includes the male pin connector 176d and the female pin connector 178d and is connected to the connector core 272 to establish earth grounding when connected in circuit through prewired conductor carrier members or track sections 22 or the like of the modular system 20.

When utilizing the alternate circuit of FIG. 15 in the modular ceiling plate element 32, the electrical device to be powered from the ceiling plate element is connected to the neutral terminal 272a and to a selected one of the power terminals 272c or 272d which may be connected in series with a remote switch and thus serves as a switch terminal to the connected power device. When the ceiling plate element is connected by hardwiring to a power supply, such as a junction box mounted in the ceiling, the power or "hot" line is connected to the connector core terminal 272c and the neutral line is connected to either of the neutral terminals 272a or 272b. The electrical device is then connected to the power terminal 272c and either the neutral terminal 272d or to the free terminal 272b which is connected to terminal 272a through the conductive crossbar 274.

Where power is to be brought to a ceiling mounted electrical device for three-way switching operation, the crossbar 274 is removed to allow terminal 272a to be employed as a neutral terminal while 272b is connected to a return power line in the three-way circuit. Still further, if the ceiling plate module is to be used in tandem with a second ceiling plate module, the neutral terminals 272a and 272b of the connector core 272 are bridged by the crossbar 274 such that an electrical device may be connected to either of the neutral terminals and to either of the terminals 272c or 272d which may be controlled by a remote switch.

FIGS. 16-18 illustrate components of a modular electrical conductor system in accordance with the present invention which finds particular application for in-wall installations. With particular reference to FIG. 16, an electrical junction box is indicated at 282 which is of similar size to a conventional electrical junction box and is adapted to be mounted in a conventional manner between generally vertical studs or the like in a wall construction. The junction box 282 includes a plurality of generally rectangular knock-outs, such as indicated at 282a, which may be removed to expose rectangular openings, one of which is indicated at 282b. The junction box 282 is adapted to receive and support a modular base housing 80 having male and female connector sites 88a-d which, when the modular housing is mounted within the junction box, are positioned in juxtaposed relation to the various knock-outs 282 such that when a knock-out is removed, a connector site is exposed through the resulting rectangular opening 282b. When employed with a modular switch or receptacle element 28 or 30, a cover plate 286 is mounted over the base housing 80 so as to expose the rocker switch actuator 102a while the peripheral edge 284a of the cover plate engages the outer wall surface, as is known. Alternatively, a plain noninterrupted cover plate could be installed over a junction box 282 when not used for switch or receptacle purposes.

With the junction box 282 mounted in desired position and with a prewired base housing 80 installed within the junction box, a plurality of modular prewired conductor carries may be connected to selected ones of the connector sites on the base housing. With particular reference to FIGS. 17a–d, the internal modular prewired conductor carries may take the form of a relatively rigid rectangular carrier member 286 having male and female end connectors 56 and 70 affixed on its opposite ends such that internal shielded pin connectors are electrically connected to conductors carried within the rectangular carrier member in similar fashion to the aforedescribed prewired conductor carriers 22.

Alternatively, the prewired in-wall conductor carrier may take the form of a cylindrical tubular fixed wall carrier 288 as illustrated in FIG. 17b having releasable male and female connector ends, such as illustrated at 290a and 290b, respectively, affixed on its opposite ends which provide shielded male and female pin connectors similar to the male and female end connectors 56 and 70.

FIG. 17c illustrates a still further embodiment of a prewired conductor carrier for in-wall use which takes the form of a flexible metallic shielded cable of conventional design but having preassembled male and female end connectors 290a and 290b which interconnect with the aforedescribed modular elements and carrier members affixed on its opposite ends. The female end connector 290b is best illustrated in FIG. 17d. The openings 282b formed in the junction box 282 upon removal of corresponding knock-outs 282a are sized to receive a male connector end 56 or 290a of a prewired conduit to facilitate electrical connection to a connector site on the base housing 80 so as to create a desired circuit configuration internally of a wall. Means (not shown) such as a suitable locking screw or detent are preferably formed in the outer wall of each female end connector 70 and 290b adjacent its free end so as to releasably retain a male end connector 56 or 290a therein when connected in coupled relation so as to releasably lock the prewired carrier members in end-to-end relation after assembly. Various alternative locking arrangements may be employed to releasably retain the prewired carrier member in coupled relation.

FIG. 18 illustrates a connector adaptor, indicated generally at 296, which has a male end connector portion 296a and a rearward threaded end 296b to facilitate connection to a conventional junction box. The adaptor 296 includes prewired conductors which may be hardwired in circuit with a power supply in the junction box, it being understood that the male connector end 296a includes shielded male pin connectors internally thereof such as in the aforedescribed male end connectors 56.

FIG. 19 is a longitudinal sectional view of the plug-in power take-off module 40 to better illustrate the internal components thereof. As illustrated, the plug-in module 40 includes a nonconductive modular housing 298 which supports a conventional three-prong plug 300 in a manner to allow selective relative rotation between the housing and plug of less than 360°. Preferably, plug 300 and housing 298 cooperate to enable 358° rotation of the plug relative to the housing about axis of the plug which is disposed substantially normal to the longitudinal axis of housing 298. Plug 300 is adapted for connection in a three-wire system and has three internal conductors connected to discrete female end connectors at a connector end 298a of the modular housing 298 to facilitate connection to the male end connector of a prewired carrier 22 or to a male connector site on a modular switch or receptacle 28 or 30, respectively. The connector end 298a is substantially identical to the female end connector 70 as employed on the carrier members 22, as best illustrated in FIG. 20.

The modular conductor system 20 may also include a permanent wired-in modular power take-off plug such as indicated generally 39 in FIG. 1 to facilitate hardwiring to a conventional in-wall mounted junction box to initiate power supply to the modular conductor system. The wired-in plug module 39 includes nonconductive housing 306 which is similar to the housing 298 employed with the plug-in module 40. Housing 306 carries a conductor support member 308 (FIG. 21) which is mounted to a wall plate 310 in a manner to allow less than 360° rotation (such as 358° rotation) of the support member 308 relative to the wall plate 310. The wall plate is adapted to be affixed, as through screws 312, to a conventional in-wall junction box to enable hardwiring of electrical conductor internally of the housing 306 to conventional conductors. A distal end of the housing 306 (not shown) houses a plurality of female pin connectors which are electrically connected to internal conductors within the housing 306 in similar fashion to the distal end 298a of plug-in module 40. The plug-in connector 42 may also be employed to supply power to the modular conductor system 20, as to a carrier member 22 or modular element 28, 30 and 32, through a plug-in cord 40a connected to a modular plug 40b having a female connector end similar to the aforedescribed female end connector 70.

The modular electrical conductor system 20 may also include one or more sonic or electronic devices (not shown) capable when activated to transmit a signal to a remote receiving module which, in turn, carries an internal switching device activated by the sonic signal to control an associated modular electrical circuit.

Having thus described various embodiments of the modular electrical control system 20, it will be appreciated that the various modular components may be connected in selected circuit fashion by one unskilled in electric circuit design or installation so as to achieve a desired power circuit and associated control thereof. The various modular elements may be readily interconnected and color-coded such that simplified instructions may be provided to enable an unskilled person to readily create a desired circuit. When employing the surface-mounted modular components, the installer may employ an existing power outlet or junction box as the source of power supply to the newly created circuit, and, through the test light 242 may continually test the installed circuit at incremental stages during installation to assure that proper connections are made.

While preferred embodiments of the present invention have been illustrated and described, it will be understood that changes and modifications may be made therein without departing from the invention in its broader aspects. Various features of the invention are defined in the following claims.

What is claimed is:

1. A modular electrical conductor system for electric circuit wiring, comprising:
    at least one elongated substantially closed modular carrier member having opposite ends and a plurality of electrical conductors extending longitudinally therethrough, a male end connector affixed to one end of said carrier member and defining a plurality of shielded male conductor contacts selectively electrically connected to said electrical conductors within said carrier member, a female end connector affixed to the other end of said carrier member and defining a pluraltiy of shielded female conductor contacts selectively electrically connected to said electrical conductors within said carrier member, said male and female end connectors being adapted for mating cooperation with similar female and male connectors, respectively, at least one modular electrical element which includes a modular low profile base housing having a generally polygonal plan configuration defining a plurality of side surfaces, said modular housing defining at least one male connector site at a selected one of said side surfaces and having a plurality of shielded male conductor contacts adapted for electrical plug-in connection with a female end connector on said carrier member, and defining at least one female connector site at another of said side surfaces and having a plurality of shielded female conductor contacts adapted for electrical plug-in connection with a male end connector on said carrier member, and a plurality of electrical conductors supported by said base housing so as to terminate at said connector sites, and a low profile cover member adapted to be releasably mounted on said base housing and having side walls adapted to overlie said side surfaces of said base housing, each of said side walls having a recess formed therein enabling access to the corresponding connector site, whereby one or more of said carrier members may be selectively electrically connected in plug-in fashion to each other and to one or more of said modular elements to establish an electric circuit.

2. A modular electrical conductor system as defined in claim 1 including a plurality of said modular elements at least one of which is adapted for connection to a power source.

3. A modular electrical conductor system as defined in claim 1 wherein said closed carrier member is adapted for telescoping relation to facilitate said selective variation in the length thereof.

4. A modular electrical conductor system as defined in claim 1 wherein said carrier member includes a substantially closed generally tubular portion having means thereon facilitating releasable attachment to a support surface without penetrating said closed tubular portion.

5. A modular electrical conductor system as defined in claim 4 including a plurality of mounting brackets selectively cooperable with said carrier member attachment means for releasably securing said carrier member to a support surface.

6. A modular electrical conductor system as defined in claim 5 wherein said closed tubular portion of said carrier member has a generally rectangular transverse cross-sectional configuration, said attachment means comprising an open T-shaped channel formed along one surface of said tubular portion and being cooperable with one or more of said mounting brackets to enable attachment of said carrier member to a support surface.

7. A modular electrical conductor system as defined in claim 1 wherein said housing has a generally rectangular plan configuration defining four side surfaces each of which defines a male or female connector site, said electrical conductors being supported by said base housing so as to terminate at said connector sites.

8. A modular electrical conductor system as defined in claim 1 including a cover plate adapted to be releasably supported by said base housing adjacent each of said connector sites, said cover plates being sized to be received within said recesses in said cover member so as to lie generally coplanar with the corresponding side walls thereof.

9. A modular electrical conductor system as defined in claim 1 wherein said system further includes at least one modular receptacle element adapted for plug-in connection to a plurality of said carrier members, said receptacle including a base housing and a removable cover member and having a pluraltiy of internal conductors and an internal switch selectively operable to vary operational modes of said receptacle.

10. A modular electrical conductor system as defined in claim 9 and further including a modular ceiling plate element adapted for plug-in connection to at least one of said carrier members, said ceiling plate element including an exposed connector core and means to enable varying internally circuit modes of operation.

11. A modular electrical conductor system as defined in claim 1 wherein said system includes a power take-off adaptor facilitating electrical connection to a power supply.

12. A modular electrical conductor system as defined in claim 1 including at least one prewired carrier member adapted for selective plug-in connection to said closed carrier member and/or said modular electrical elements, and defining an angled prewired corner track facilitating variation in the circuit path direction.

13. A modular electrical conductor system as defined in claim 1 wherein said system includes a modular test light adapted for releasable plug-in connection to said carrier member and said modular electrical element so as to enable testing for electrical power thereto.

14. A modular electrical device comprising a low profile modular base housing having a substantially planar base surface and being of generally polygonal plan configuration, said housing having a plurality of side surfaces about its periphery each of which defines a discrete connector site, a plurality of electrical conductor harnesses supported by said base housing and defining a plurality of discrete circuit paths through said base housing, each of said conductor harnesses having terminal conductor ends selectively positioned at said connector sites such that each connector site includes a plurality of spaced shielded conductor ends defining a male or female plug-in connector site, one of said conductor harnesses defining a primary power circuit and another of said conductor harnesses defining a secondary unit, a first unexposed switch supported within said base housing in operative connection with said primary and secondary circuits in a manner to enable selective transfer of electric power from said primary to said secondary circuits when said primary power circuit is connected to a power source, a second switch supported by said base housing in operative connection to said primary circuit and being operable externally of said housing to control electrical power to said primary power circuit when connected to the power source, and a low profile cover member adapted to be releasably mounted on said base housing and having a plurality of side walls adapted to overlie the side surfaces of said base housing, each of said side walls having a recess formed therein enabling access to the corresponding connector site.

15. A modular electrical device as defined in claim 14 wherein said conductor harnesses include an electrically neutral conductor harness and an earth ground conductor harness, said shielded conductor ends at each of said connector sites including a terminal end corresponding to each of said primary, secondary, neutral and earth ground conductor harnesses.

16. A modular electrical device as defined in claim 14 wherein selected ones of said connector sites define male connector sites and others of said connector sites define female connector sites, said male and female connector sites being adapted, respectively, for selective releasable interconnection to similar female and male connectors on separate and discrete modular electrical carrier members and modular electrical elements.

17. A modular electrical device as defined in claim 14 wherein each connector site defines a plurality of substantially parallel shielded conductor ends disposed in coplanar relation.

18. A modular electrical device as defined in claim 14 wherein said base housing is generally rectangular in plane configuration and defines four connector sites thereon, said cover member being adapted to expose each of said connector sites when mounted on said base housing.

19. A modular electrical device as defined in claim 18 including a plurality of cover plates each of which is adapted for releasable operative association with said base housing so as to overlie one of said connector sites with said cover member mounted on said base housing, said cover plates being selectively removable to expose the corresponding connector site.

20. A modular electrical switch device comprising, in combination, a base housing defining a plurality of external connector sites, a primary power circuit supported by said base housing and including an input connector end disposed at one of said connector sites and adapted for connection to an external power supply, said power circuit having an output connector end disposed at another of said connector sites for connection to an external circuit, an auxiliary switch circuit supported by said base housing and having a first connector end disposed at said one said connector site and a second connector end disposed at said other connector site, a primary switch supported by said base housing in electrical connection with said power and auxiliary circuits in a manner to enable connection of said power circuit to said auxiliary circuit, and at least one secondary switch supported by said base housing in electrical circuit with said auxiliary circuit in a manner to isolate at least one of said connector ends of said auxiliary circuit from the remaining portion of said auxiliary circuit.

21. A modular electrical switch device as defined in claim 20 including a cover member adapted for releasable mounting on said base housing so as to cover said secondary switch and prevent actuation thereof while exposing said primary switch to enable actuation thereof.

22. A modular electrical switch device as defined in claim 21 wherein said base housing defines four connector sites thereon, said power and auxiliary circuits having conductive connector ends disposed at each of said connector sites, and including at least one additional discrete circuit supported by said base housing and having a connector end disposed at each of said connector sites, said additional circuit being adapted for use as a common ground circuit through said switch device.

23. A modular electrical switch device as defined in claim 22 wherein said connector sites define plug-in connector sites, said connector ends of said circuits disposed at said connector sites including parallel spaced male and female pin connectors lying in generally coplanar relation, said connector sites being configured to shield the corresponding pin connectors from contact during handling of the switch device whereby to preclude electrical shock hazards during connection of the switch device to other modular electrical elements.

24. A modular electrical outlet connector device adapted for connection in an electrical system which includes a terminal box containing at least two electrical conductors, said outlet connector device comprising:
 a mounting plate adapted for releasable attachment to the terminal box,
 a connector member supported by said mounting plate for rotation about an axis generally normal to said mounting plate in a manner to limit rotation of said connector member through less than 360° about said axis,
 and a plurality of electrical conductors extending through said connector member and having first ends adapted for connection to an external electrical power supply,
 said connector member having a distal connector end defining a plurality of shielded pin connectors each of which is conductively connected to a selected one of said electrical conductors, said distal connector end being adapted for plug-in connection to an external electrical device.

25. A modular electrical outlet connector as defined in claim 24 wherein said connector member includes an elongated closed tubular body lying in a plane parallel to and spaced from the plane of said mounting plate so as to facilitate plug-in connection to a prong receiving type electrical receptacle.

26. A modular electric outlet connector as defined in claim 25 wherein said distal connector end includes a plurality of shielded pin connectors each of which has electrical connection to one of said electrical conductors within said connector member.

27. A modular electrical connector device for use in completing an electrical circuit through a passage in a wall defined by first and second generally parallel spaced wall surfaces intersected by the passage, said connector device comprising, in combination, a pair of wall plates each of which is adapted to be mounted on a selected one of the wall surfaces proximate the associated passage, a conductor carrier member mounted on each of said wall plates in generally parallel relation thereto, each of said carrier members having a first distal connector end and a second connector end extending through the corresponding wall plate and adapted for connection to the second connector end of the other track section when said second connector ends are positioned in axially aligned relation into said passage; and a plurality of electrical conductors extending therethrough and having connector ends adapted for connection to the connection ends of other conductors in an electrical circuit.

28. A modular electrical connector device as defined in claim 27 wherein at least one of said second connector ends is adapted for telescoping relation to facilitate connection to the connector end of the other conductor carrier in varying wall thicknesses.

29. A modular connector device as defined in claim 28 wherein said coupling means includes male and female end connectors formed, respectively, on the swivel ends of said conductor carrying connector members.

30. A modular electrical outlet connector adapted to plug into a wall receptacle for providing electrical power to a modular electrical device, said outlet connection including an elongated closed connector housing lying in a plane generally parallel to and spaced from the plane of said wall receptacle, said connector having a plug connector supported within said housing in a manner enabling rotation through less than 360° about a rotational axis generally normal to the longitudinal axis of said connector housing, said plug being adapted for plug-in connection to a prong receiving type electrical receptacle, said housing defining an outward distal end having connector means enabling plug-in connection to an external electrical device.

31. A modular electrical conductor system for electric circuit wiring, comprising:
   at least one elongated substantially closed carrier member having opposite ends and a plurality of electrical conductors extending longitudinally therethrough,
   a male end connector affixed to one end of said carrier member and defining a plurality of male conductor contacts selectively electrically connected to said electrical conductors within said carrier member,
   a female end connector affixed to the other end of said carrier member and defining a plurality of female conductor contacts selectively electrically connected to said electrical conductors within said carrier member, said male and female end connectors being adapted for mating cooperation with similar female and male connectors, respectively, and
   at least one modular electrical switch element including a modular housing having a plurality of electrical conductors therein, said modular housing defining at least one male connector site having a plurality of male conductor contacts adapted for electrical plug-in connection with a female end connector on said carrier member, and defining at least one female connector site having a plurality of female conductor contacts adapted for electrical plug-in connection with a male end connector on said carrier member, said switch element having a first primary exposed switch operative from externally of said housing to control electric power through a first circuit internally of said switch element and having a second auxiliary unexposed switch within said housing and selectively operable to vary the internal circuit controlled by said primary exposed switch.

* * * * *

UNITED STATES PATENT AND TRADEMARK OFFICE
CERTIFICATE OF CORRECTION

PATENT NO. : 4,875,871
DATED : October 24, 1989
INVENTOR(S) : D.J. Booty, Sr. and D.J. Booty, Jr.

It is certified that error appears in the above-identified patent and that said Letters Patent is hereby corrected as shown below:

On the cover page, the filing date identified on line [22] should read --Nov. 9, 1984--.

Signed and Sealed this

Fifteenth Day of September, 1992

Attest:

DOUGLAS B. COMER

*Attesting Officer*  *Acting Commissioner of Patents and Trademarks*